United States Patent [19]
Onuma et al.

[11] Patent Number: 5,378,138
[45] Date of Patent: Jan. 3, 1995

[54] VALVE GATE INJECTION MOLDING APPARATUS

[75] Inventors: Susumu Onuma; Kin-ichi Yokoyama, both of Yonezawa, Japan

[73] Assignee: Seiki Kabushiki Kaisha, Tokyo, Japan

[21] Appl. No.: 168,466

[22] Filed: Dec. 16, 1993

[30] Foreign Application Priority Data

Dec. 21, 1992 [JP] Japan .................... 4-340206

[51] Int. Cl.⁶ ............................. B29C 45/23
[52] U.S. Cl. ........................... 425/549; 264/102; 264/328.15; 425/564; 425/566; 425/812
[58] Field of Search ............... 425/562, 564, 565, 566, 425/812, 549; 264/102, 328.9, 328.15

[56] References Cited

U.S. PATENT DOCUMENTS

| | | | |
|---|---|---|---|
| 4,026,518 | 5/1977 | Gellert | 425/242 |
| 4,538,666 | 9/1985 | Takeshima et al. | 425/812 |
| 4,740,151 | 4/1988 | Schmidt et al. | 425/549 |
| 4,747,770 | 5/1988 | Schmidt | 425/549 |
| 4,779,667 | 10/1988 | Fujino et al. | 425/812 |
| 5,238,391 | 8/1993 | Teng | 425/549 |

*Primary Examiner*—Tim Heitbrink
*Attorney, Agent, or Firm*—Elliot M. Olstein; Raymond J. Lillie

[57] ABSTRACT

A valve gate injection molding apparatus, in which the gas produced within a heating probe is discharged through a gas discharge outlet groove from the base side of a valve pin, leak of the resin melt is prevented by flowing a cooling fluid for controlling the temperature to increase viscosity of the resin melt, and preventing overheat of the valve pin actuating assembly caused by heat conduction from the heated and pressurized resin melt.

4 Claims, 5 Drawing Sheets

5,378,138

VALVE GATE INJECTION MOLDING APPARATUS

BACKGROUND OF THE INVENTION

1. Field of the Invention

The present invention relates to a novel valve gate injection molding apparatus having a hot runner assembly.

2. Brief Description of the Prior Art

In general, a valve-gate injection molding apparatus has a valve pin adapted to open and close a gate which injects a resin melt into a mold cavity. The base end of the valve pin is allowed to be open or closed by a reciprocally movable actuating means such as a hydraulic cylinder or a piston mounted within a fixed side mounting plate. Approximately half a length of the valve pin is within a hot runner which serves as a resin melt passage and surrounded by the heated and pressurized resin melt.

In addition, by mounting a manifold on the mounting plate, and providing a plurality of heated nozzles on the manifold, it is possible to perform a multiple molding operation to achieve high productivity with increased number of gates, that is, with a number of mold cavities.

However, in the conventional molding apparatus mentioned above, the gas produced from the melt and the heated and pressurized melt itself are likely to leak through the gap between the receiving hole of the heated nozzle and the inner surface of the valve pin in the direction from the outer surface to the base of the valve pin.

The produced gas, which will degrade the quality of molded products, should be discharged out of the heating probe. The leak of the resin melt, which will disturb the molding function of the valve pin or other members, also should be prevented. Also, the valve pin actuating means should be prevented from various troubles caused by overheat due to heat conduction from the heated and pressurized resin melt.

To prevent the advantages stated above, for example, the Japanese patent publication No. 59-47653(1984) relating to "A push seal for a valve pin" discloses a valve pin, for which a stepped portion is provided for preventing the resin melt from Flowing into the sliding portion between the heating probe and valve pin, and the seal is provided by the shoulder formed as a result of the stepped portion. A disadvantage still remains therein, that the resin melt tends to flow into the sliding portion during operation of the valve pin.

Japanese laid-open patent publication No. 63-107528(1988) relating to "Valve gate multiple injection molding apparatus" discloses an assembly for staying the leaking resin in a dish-shaped bushing to prevent it from its outboard leaking. However, the method therein is not suitable for a long time operation.

Japanese patent publication No. 4-6532(1992) also relating to "Valve gate multiple injection molding apparatus" discloses a cooling means for the hydraulic cylinder of the valve pin actuating assembly. This structure enables cooling adjacent the cylinder, but still disables thermal isolation of the heating manifold.

SUMMARY OF THE INVENTION

The valve gate type injection molding apparatus according to the present invention comprises a heated nozzle, the base of which engages a manifold, the tip thereof provided a nozzle tip, inside thereof provided a resin melt passage in communication with the manifold to the nozzle tip and a valve pin receiving hole fit to a valve pin; the valve pin slidably mounted through the valve pin receiving hole and secured to the end of the heated nozzle to open and close a gate disposed on the end of the nozzle tip; a sleeve pin having a base end thereof secured to a temperature control plate and the end surface thereof engaged with a fixed side mounting plate, and the other end positioned through the manifold and connected to the heated nozzle, further the valve pin having the valve pin receiving hole for slidably receiving the valve pin; and a driving assembly secured to the mounting plate for slidably moving the valve pin. Further, the apparatus includes a gas discharge outlet ranging from the valve pin, through the end surface of the sleeve pin to the end surface of a temperature control plate and in communication with the exterior of the temperature control plate, and a fluid flowing opening for flowing a fluid for temperature control of the portion of the sleeve pin mounted on the temperature control plate.

An object of the present invention is to provide a valve gate injection molding apparatus, in which any gas, produced from the heated and pressurized resin melt, is let flow through a sliding surface between a valve pin and a valve pin receiving hole formed within a heated nozzle, further through a sliding surface between the valve pin and another valve pin receiving hole formed within a sleeve pin, and finally discharged from a gas discharge outlet provided on an end surface of a temperature control plate.

Another object of the present invention is to provide a valve gate injection molding apparatus, which is provided with a cooling means for circulating a cooling liquid to control the temperature of a surface facing the fixed side mounting plate of the sleeve pin, to lower the temperature and increase viscosity of the resin melt to prevent leak of the resin melt, and, at the same time, to reduce heat conduction into and prevent overheat of the valve pin actuating means.

As described above, the most important problem, which is still maintained in the conventional valve gate injection molding apparatus to prevent the leak of the resin melt and to discharge the produced gas, is solved by controlling the temperature adjacent the sleeve pin mounting area and increasing viscosity of the resin melt in accordance with the molding condition for the resin used.

A still further object of the present invention is to provide a solution for another problem involved in the heat conduction within the manifold, that is, to lower the temperature of the actuating means such as a cylinder which slidably actuates the valve pin, preventing the oil leak when a hydraulic cylinder is employed, and further the temperature of the retaining plate of the heated nozzle is controlled in the same condition as that for the fixed side mounting plate, and, as a result, the valve pin can operate always in the coaxial condition to also prevent the scuffing of the valve pin.

DETAILED DESCRIPTION OF THE PREFERRED EMBODIMENTS

Figure 1:
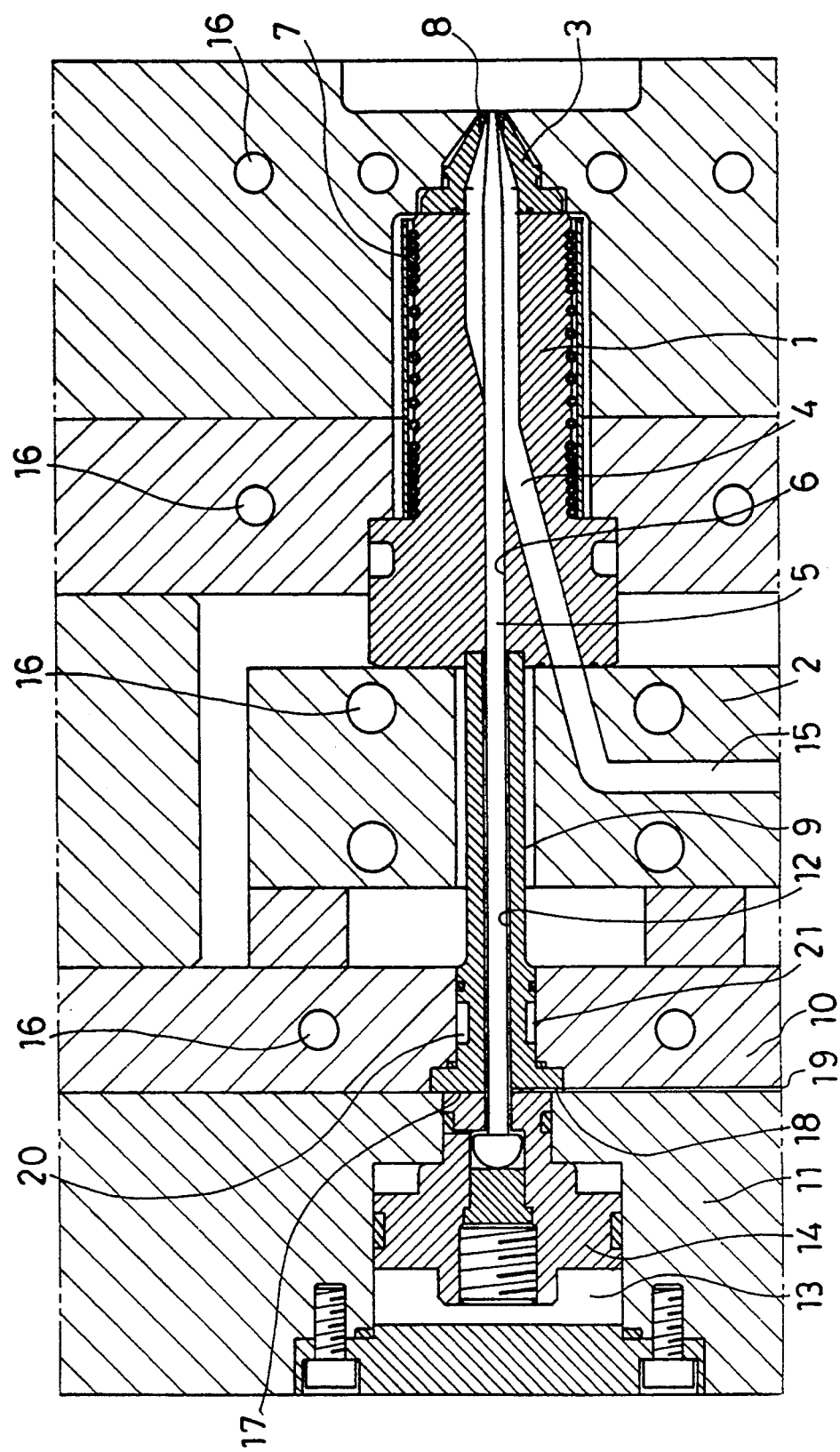
FIG. 1 is a sectional view of a valve gate injection molding apparatus using a hot runner metal mold according to the present invention.
Figure 2:
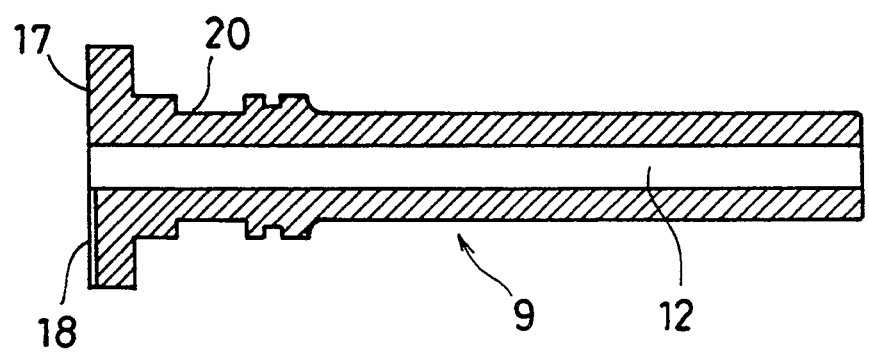
FIG. 2 is a sectional view of a sleeve pin in FIG. 1.
Figure 3:
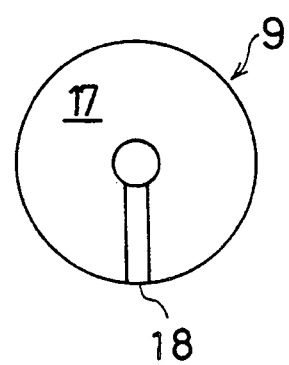
FIG. 3 is a left side end view of FIG. 2.

As shown in FIG. 1, a reference numeral 1 is a heating probe 1, whose base portion engages a manifold 2, and the tip end is provided with a nozzle tip 3. Further, inside thereof is provided a resin melt passage 4, which connects a manifold 2 with a valve pin 5, and, outside thereof, a heater 7 is provided.

The valve pin 5 slidably moves through the receiving hole 6 to open and close a gate 8 of nozzle tip 3 mounted on the end of heated nozzle 1.

A sleeve pin 9, which is mounted with its one end on a temperature control plate 10 and the end surface engages a fixed side mounting plate 11, extends through a manifold 2 and connected with its other end to the heated nozzle 1. Inside thereof is provided a longitudinal opening for slidably receiving a valve pin 5.

An actuating assembly, provided within the mounting plate 11, includes a cylinder 13 and a piston 14, to which a lower end of the valve pin 5 is retained for slidably actuating the valve pin 5 by way of hydraulic pressure. The molten resin can be supplied to nozzle tip 3 attached to the end of heated nozzle 1.

Fluid passages 16 are formed to circulate cooling fluid or water through each of heated nozzle 1, manifold 2 and temperature control plate 10 so as to maintain these members in a suitable temperature.

Although not shown, a plurality of heated nozzle 1 are attached to the manifold 2 for the purpose to perform a multiple molding operation.

More specifically, the structural feature of the invention is described hereinafter.

The sleeve pin 9 has its end surface 17, which communicates with a sleeve pin receiving hole 12, formed with a gas outlet groove 18 which engages mounting plate 11. Further, the gas outlet groove 18 is in communication with and outside gas outlet groove 19 formed between the plate 11 and temperature control plate 10.

A recess 20 formed around the sleeve pin 9 serves another fluid passage 21 for circulating the cooling fluid between sleeve pin 9 and temperature control plate 10.

The function and effect achieved by the invention will be described below.

The resin melt heated and pressurized in the heated nozzle 1 is injected from the end of nozzle tip 3 into a mold cavity, upon opening of valve pin 5.

The gas produced from the molten resin flows through the sleeve pin receiving holes 6 and 12, and discharged through the gas outlet grooves 18 and 19.

On the other hand, the temperature is controlled by circulating the cooling fluid through the fluid passages 21, and also lower the temperature of the molten resin to prevent leakout of the resin. At the same time, heat conduction to the actuating assembly is reduced to prevent overheat.

Figure 4:
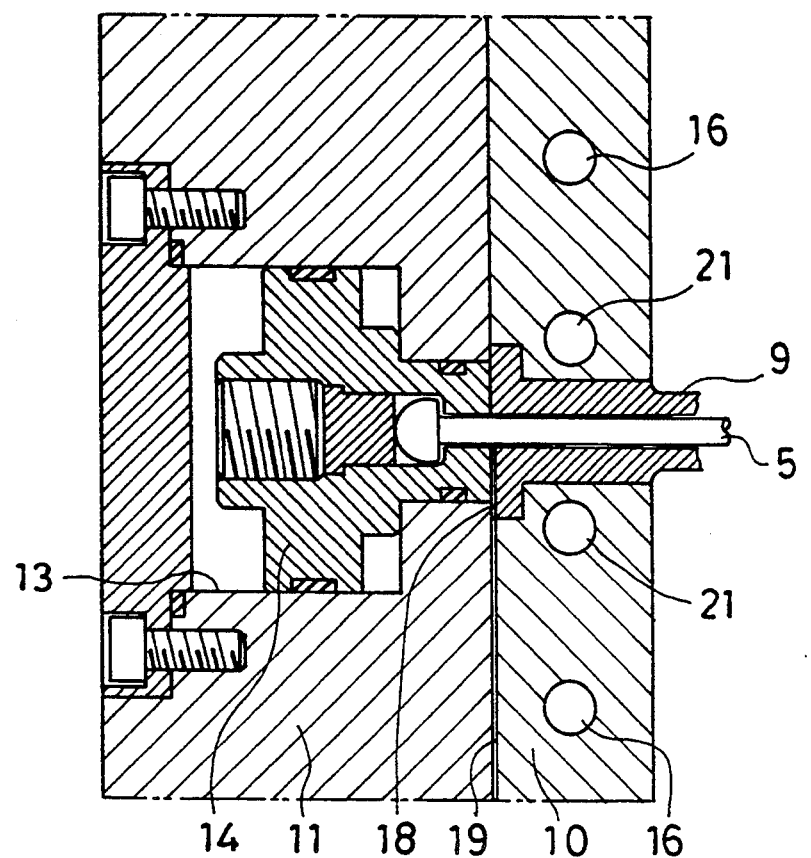
FIG. 4 is a sectional view of another embodiment of the assembly including a temperature control plate, a mounting plate and a sleeve pin.

As shown in another embodiment of FIG. 4, the fluid passage 21 may be formed adjacent the sleeve pin 9 in the temperature control plate 10. All other structures are the same, and therefore the reference numerals are the same as those in the embodiment of FIG. 1, and also both embodiments provide the same effect as each other.

Figure 5:
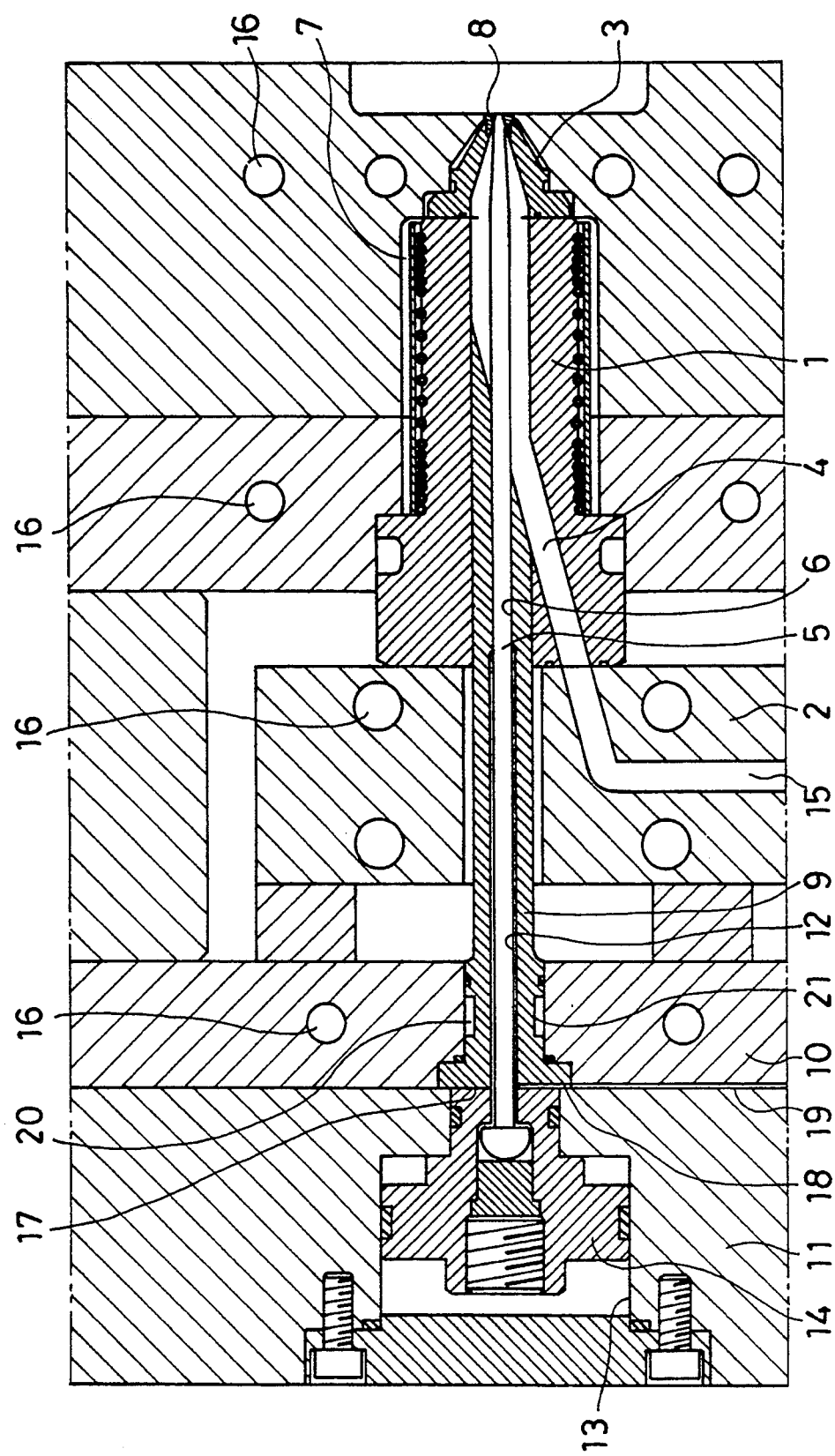
FIG. 5 is a sectional view of a still further embodiment.
Figure 6:
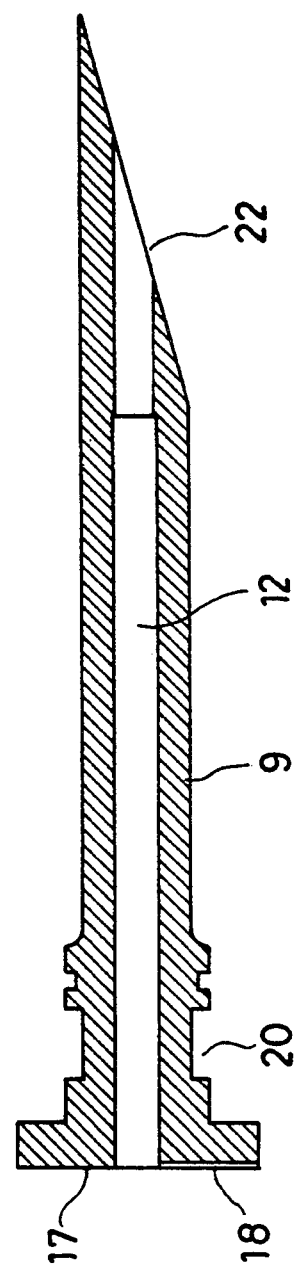
FIG. 6 is a sectional view of a sleeve pin in FIG. 5.

A still further embodiment shown in FIGS. 5 and 6, is featured in that a sleeve pin 9 is obliquely cut with its end so as to form a corner 22, forming a part of the side surface of the melt passage 4 communicating from manifold 2 to nozzle tip 3. The other structure is the same, and therefore the reference numerals are the same as those in the embodiment of FIG. 1, and also both provide the same effect as each other.

What is claimed is:

1. An injection molding apparatus for producing a molded product comprising:

a heated nozzle having a rear end engaging with a manifold, a front end having a nozzle tip attached thereto and a resin melt passage extending through said heated nozzle and communicating said rear end to said front end, said nozzle tip having a resin melt passage in communication with a mold cavity, whereby the resin melt passage of said heated nozzle is in alignment with said resin melt passage of said nozzle tip, said heated nozzle also having a valve pin receiving hole communicating with said resin melt passage of said heated nozzle;

a sleeve pin having a rear end secured to a temperature control plate and a front end positioned through said manifold and connected to said heated nozzle, said sleeve pin having a receiving hole extending through said sleeve pin and communicating said rear end of said sleeve pin to said front end of said sleeve pin;

a valve pin being slidably mounted through said receiving hole of said sleeve pin and said valve pin receiving hole, a rear end of said valve pin connected to a driving assembly and a front end of said valve pin engaging said nozzle tip, said driving assembly reciprocating said valve pin whereby reciprocal motion of said valve pin opens and closes said resin melt passage of said nozzle tip, said driving assembly being secured to a mounting plate;

said manifold being provided with a resin melt passage for supplying said resin melt to the resin melt passage of said heated nozzle;

a gas discharge outlet positioned the length of said receiving holes and extending through a rear surface of said temperature control plate to the exterior of said temperature control plate to allow gas produced from the melted resin to escape; and a fluid channel in said temperature control plate for circulating a cooling fluid for controlling the temperature of said sleeve pin.

2. The injection molding apparatus of claim 1, wherein said fluid channel comprises a groove surrounding said sleeve pin for circulating a cooling fluid between said sleeve pin and said temperature control plate.

3. The injection molding apparatus of claim 1, wherein said fluid channel is adjacent said sleeve pin for circulating a cooling liquid for temperature control of said sleeve pin.

4. The injection molding apparatus of claim 1, wherein said sleeve pin is slant cut on its front end to form a part of a side wall of said resin melt passage.

* * * * *